(12) United States Patent
Dutouquet et al.

(10) Patent No.: US 7,976,659 B2
(45) Date of Patent: Jul. 12, 2011

(54) ZERO GAP INTEGRATION OF SWITCHING MODULES WITH NEGATIVE VACUUM PROCESS

(75) Inventors: Denis Dutouquet, Thumeries (FR); Jean-Marie Bourgeois-Jacquet, Sr., Ronchin (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 450 days.

(21) Appl. No.: 12/265,352

(22) Filed: Nov. 5, 2008

(65) Prior Publication Data
US 2009/0120558 A1     May 14, 2009

(30) Foreign Application Priority Data
Nov. 6, 2007   (FR) ...................................... 07 58808

(51) Int. Cl.
*B29C 65/70* (2006.01)
*B29C 44/12* (2006.01)
*B32B 5/20* (2006.01)

(52) U.S. Cl. .......... 156/78; 156/245; 156/247; 156/293; 264/46.5; 264/46.8

(58) Field of Classification Search ................ 156/78, 156/79, 245, 247, 293; 264/46.5, 46.8
See application file for complete search history.

(56) References Cited

U.S. PATENT DOCUMENTS

| | | | | |
|---|---|---|---|---|
| 4,350,544 | A * | 9/1982 | Matsuno | 156/79 |
| 4,904,429 | A * | 2/1990 | Takahashi et al. | 264/46.7 |
| 6,483,048 | B1 * | 11/2002 | Bontrager et al. | 200/5 R |
| 2006/0284330 | A1 * | 12/2006 | De Winter et al. | 264/46.5 |
| 2007/0132132 | A1 * | 6/2007 | Saelen et al. | 264/46.8 |

* cited by examiner

*Primary Examiner* — Michael A Tolin
(74) *Attorney, Agent, or Firm* — Dickinson Wright PLLC

(57) ABSTRACT

A process for assembling a composite piece for use in the interior of an automobile. An outward facing skin of the composite piece is connected to a substrate by a foaming material, and at least one switch item is integrated seamlessly into the composite piece. Part of the process includes wrapping a visible portion of each switch item with the outward facing skin. A spare piece is placed against the surface of the visible area of each item opposite the surface located on the visible surface of the composite piece. A foaming material is injected between the skin and the substrate, and then each spare piece is removed. A control component is placed at each cavity left where the removed spare pieces blocked expansion of the foaming material.

13 Claims, 2 Drawing Sheets

ZERO GAP INTEGRATION OF SWITCHING MODULES WITH NEGATIVE VACUUM PROCESS

FIELD OF THE INVENTION

This invention relates to the field for the creation of structural and/or decorative components made of plastic. Specifically, it concerns composite pieces including a foamed component covered with a skin or similar covering element, into which at least one item forming a device for switching and connecting said skin is integrated in order to define a virtually seamless visible surface. This application claims priority benefit of French patent application no. 07 58808, filed 6 Nov. 2007, which is incorporated herein by reference, in its entirety, for all purposes.

BACKGROUND INFORMATION

The outfitting of a vehicle compartment, such as an entire instrument panel, is often made of components with a skin covering what can be seen by the occupant of the vehicle. Preferably, the exposed surface, commonly called the visible surface, should be designed to have an aesthetically pleasing appearance.

The known processes do not allow for creating composite pieces in which the transitional area between the items that form built-in switching devices in said composite pieces and the visible surface of the composite pieces are seamless so as to prevent the build up of impurities and to give the visible surface a satisfying aesthetic appearance.

Moreover, in the composite pieces manufactured by the known processes, when an item forming a switching device breaks down, it is not possible to service the switching device, since the switching devices are typically integrated into the composite piece concerned in a fixed manner and is inaccessible. However, the majority of breakdowns or deficiencies related to this type of item are generally inherent to wear or breakage of the means of actuation that transmits to an actuator the pressure exerted by the user on the visible area of the item. Since this actuation component is not accessible, it cannot be serviced.

SUMMARY OF THE INVENTION

One aspect of the present invention is a manufacturing process of a composite piece. Another aspect of the present invention is the composite piece obtained by the implementation of this manufacturing process, in particular, a structural and/or decorative component to be mounted on the inside of a motor vehicle.

The present invention mitigates the above mentioned disadvantages with a process that makes it possible to produce in an easy manner a composite piece provided with one or more items forming switching devices. The visible surface of the composite piece produced is seamless, even in the area of transition between each item and the visible surface of the composite piece, and it is possible to easily replace certain parts of all the items, for example a means of actuation.

A process, according to one mode of practicing the present invention, assembles a composite piece for a vehicle compartment, such that the composite piece has a skin connected to a substrate via a foaming material, and has at least one item forming a switching device. The switching device has a visible portion, which is joined to a control component, that is connected to an electrical control circuit, in order to transmit switching information to the electrical control circuit.

At least in part, this process includes wrapping a large amount of the visible area of each item with a skin, so that the skin retains the visible area and that the skin and the visible area are joined. The joining of the skin with the visible area defines the visible surface of the seamless composite piece along the area of transition between the skin and the visible area of each item forming the switching device. This is accomplished via complementary stages of action.

One stage of the process involves that a substrate is arranged so that it faces the skin, with the substrate having an opening for a passage aligned with the visible area. Another stage of the process involves placing a spare piece against the face of the visible area of each item opposite the face located on the visible surface, provided that the shape of this spare piece should correspond at least to the volume intended for occupancy by the control component in the space between the substrate and the skin, in a service position of the item concerned, and provided that the cross section of this spare piece is equal to the shape of the corresponding passage opening located in the substrate, so that the spare piece extends, in this position, at least to the passage opening. Another stage of the process involves injecting of a foaming material between the skin and the substrate, so that the aforementioned foaming material expands within the entire located between the skin and the substrate, and in particular around each spare piece. Another stage of the process involves withdrawing each spare piece after the expansion of the foaming material. Another stage of the process involves setting up an item in each cavity created through the corresponding passage opening.

BRIEF SUMMARY OF THE DRAWINGS

The invention will be better understood upon review of the description below of an embodiment of the invention, given as a non-restrictive example, and explained with reference to the attached schematic drawings.

DETAILED DESCRIPTION

Figure 1:
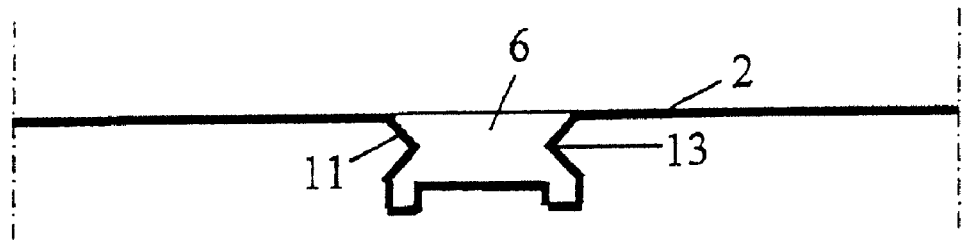
FIG. 1 shows a schematic cross-sectional view of the visible area of an item forming a switching device, wrapped in the skin following one step of a process, according to an embodiment of the present invention.

The process, according to embodiments of the present invention, assembles a composite piece. Referring generally to FIGS. 1-4, results of steps of the process are illustrated. An assembled composite piece 1 for a vehicle compartment has a skin 2 connected to a substrate 3 with a foaming material 4. At least one item 5 is included in the composite piece 1 to form a switching device that has a visible area 6 joined to a control component 8, which is connected to an electrical control circuit, in order to transmit switching information to the electrical control circuit.

A step of this process involves wrapping a large amount of the visible area 6 of each item with a skin 2, so that the skin 2 retains the visible area 6 and that the skin 2 and the visible area 6 are joined thus defining the visible surface of the seamless composite piece 1 along the area of transition between the skin 2 and the visible area 6 of each item 5 forming the switching device. The process has a number of complementary stages of action.

According to a first stage of the process, a substrate 3 is arranged so that it faces the skin 2, with the substrate having an opening 14 (see FIG. 3) for a passage aligned with the visible area.

Figure 2:
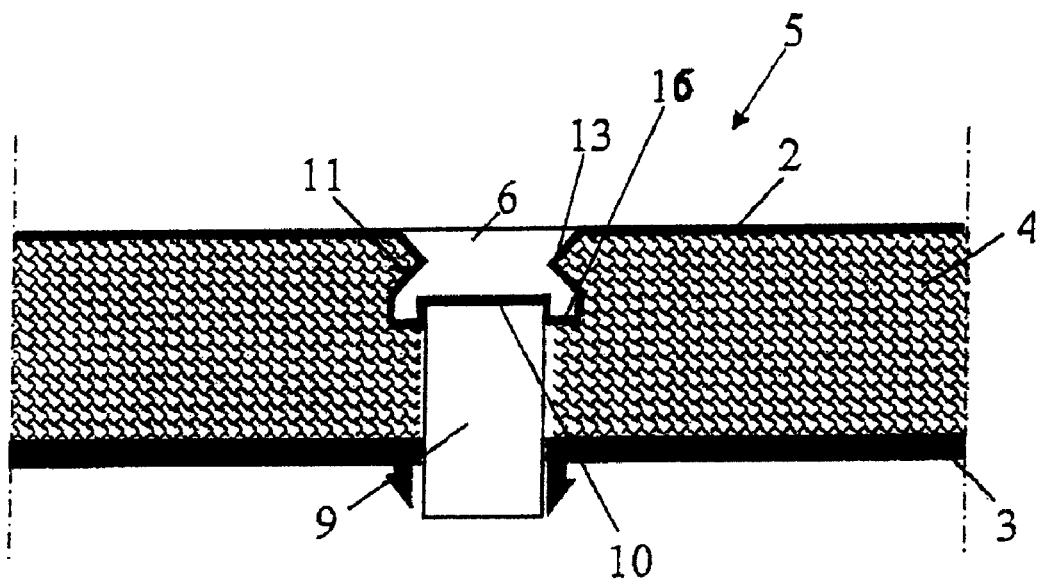
FIG. 2 shows a schematic cross-sectional view illustrating the position of the spare piece after foaming material has been injected, according to an embodiment of the present invention.

In a second stage of the process, referring to FIG. 2, a spare piece 9 is placed against the face 10 of the visible area of each item opposite the face located on the visible surface, provided that the shape of this spare piece 9 should correspond at least to the volume intended for occupancy by the control component in the space between the substrate and the skin, in a service position of the item concerned, and provided that the cross section of this spare piece is equal to the shape of the corresponding passage opening located in the substrate 3, so that the spare piece extends, in this position, at least to the passage opening.

A third stage of the process involves injecting of a foaming material 4 between the skin 2 and the substrate 3, so that the aforementioned foaming material expands within the entire located between the skin and the substrate, and in particular around each spare piece.

Figure 3:
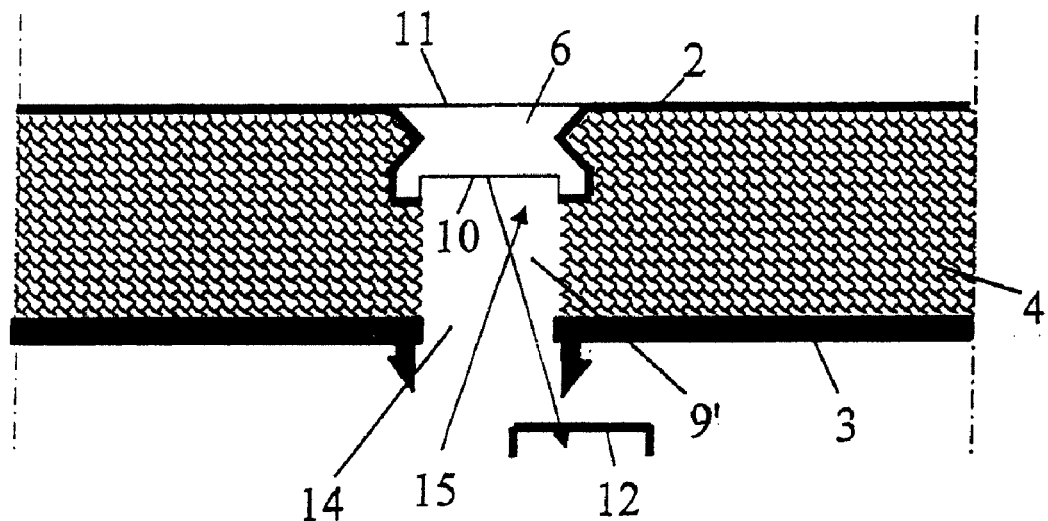
FIG. 3 shows a schematic cross-sectional view illustrating the position of the spare piece after a spare piece has been removed to leave a cavity in the foaming material, according to an embodiment of the present invention.

According to a fourth stage of the process, referring to FIG. 3, each spare piece 9 is withdrawn after the expansion of the foaming material. This leaves a cavity 9' in the foaming material 4 where the spare piece 9 had been.

At a fifth stage of the process, an item is set up in each cavity created through the corresponding passage opening.

This embodiment of the process is simple to implement and does not require especially elaborate tools. The injection of the foaming material 4 between the skin 2 and the substrate 3 may be performed in the same mold which is used in the first stage of the process, so that the costs to implement this process can be advantageously limited.

For each item, the control component 8 is connected to the electrical circuit that is intended to be controlled by the actuation of the item 5. The items 5 forming switching devices may be a push button-type, or rocker-type, or they may be of the touch sensitive key-type, not requiring the application of force to actuate it.

According to one embodiment of the invention, the item 5 is created with this type of touch sensitive key. According to a first alternative of this embodiment, the process may consist of integrating a control component 8 provided with a means for capacitive detection. Thus, by touching the visible surface of the visible area 6, a variation in the electrical capacitance of a condenser causes a switching action to be performed on the level of an electronic control circuit.

According to a second alternative of this embodiment, the process integrates a control component 8 having an optical detector. In this case, it is the passage of a finger in front of the item 5 which is optically detected and which causes the switching action to be performed on the level of the electronic circuit.

According to a third alternative, the process integrates a control component 8 having an electric field detector that interprets a variation in an electric field due to the passage of a finger in front of the item 5 as a command for switching action to be performed on the level of the electronic circuit.

According to a second embodiment, the item 5 is worked by the application of pressure. Under these conditions, the visible component 6 may be set to work with the control component 8 via a mobile actuation module 7 suitable for transmitting to the control component 8 the application of pressure exerted on the visible area 6 in that it uses a spare piece 9, the form of which corresponds to at least the volume set to be occupied by the actuation module 7 and the control component 8 in the space included in the substrate 3 and the skin 2, and also setting up the actuation module 7 during the fifth stage of the process.

Figure 4:
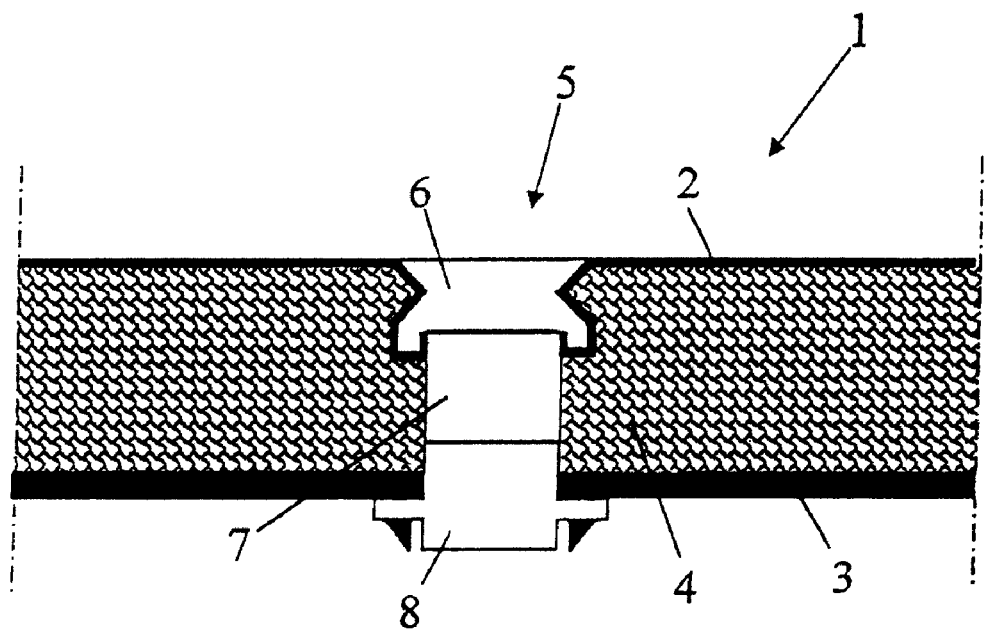
FIG. 4 shows a schematic cross-sectional view illustrating a composite piece created according to another embodiment of the process, according to an embodiment of the present invention.

In this implementation, referring to FIG. 4, each item 5 integrated into the composite piece 1 is made up of three components, namely a visible area 6 which is wrapped in the skin 2, one actuation module 7, and one control component 8.

The visible area 6 may be compressible or rigid. If it is rigid. Id it is rigid, the foaming material 4 may be selected so that after its expansion it has the capacity to be compressed. in such a way that the pressure exerted by a user on the visible area 6 may be transmitted to the control component 8 via a deformation of the foam 4 and the skin 2. When the visible area 6 is selected to be flexible, it is capable of being depressed in order to press the actuation module 7.

The configuration of the item 5, along with the disclosed process that integrates the item into the composite piece, is advantageous because it provides for a finished composite piece 1 in which the control component 8 or the actuation module 7 and the control component 8 of each item 5 can be easily replaced or repaired.

In the second embodiment of the invention process, each actuation module 7 and its corresponding control component 8 may be either connected together before their implementation, or connected together during their implementation. One way to carry this out is applying a point of adhesive on the actuation module 7 before installing the control component 8.

As another option for practicing the second embodiment, the actuation module 7 and the control component 8 are not connected together. When the control component 8 is not attached to the actuation module 7, it is sufficient to detach the aforementioned control component 8 from the substrate 3 to access the actuation module 7, and each of the two components may thus be replaced. When these two components are attached to each other, they are replaceable together in the event of failure of the item 5.

Referring to FIG. 4, the process can include, for each item 5, attaching the corresponding control component 8 on the substrate face 3, opposite the skin 2, for example via a snap-lock connection. In the second embodiment, this attachment ensures the positioning of the actuation module 7 in the cavity 9' regardless of whether the actuation module 7 and the control component 8 are connected to each other or not.

The process, according to some embodiments of the invention includes integrating at least one backlit item 5, without needing the complementary components. In order to do this, the item 5 may include a translucent, even transparent visible area 6 and an actuation module 7 or a control component 8 integrating a lighted device. In instances when the skin 2 is selected to be transparent, it is advantageous to use a foaming material that will be opaque after it expands, so that the light emitted is only diffused in the visible area 6.

According to some embodiments of the invention, referring to FIG. 3, the process includes creating a composite piece 1 with skin 2 that is opaque at least where each item 5 is integrated and which has a cut out area 12, which was in contact with the spare piece 9, that is removed from the skin 2 after the spare piece 9 has been removed and before the implementation of the fifth stage of the process. This cutting and removal makes it possible to ensure that light emitted by the actuation module 7 or the control component 8 is transmitted to the visible area 6 of item 5 concerned.

According to one embodiment, the first step of the process includes:

placing at least one item 5 forming a switching device on the visible surface of a mold for vacuum molding, aligning a skin 2 above the mold for vacuum molding, applying an aspirating force or the vacuum from the vacuum molding, attracting the skin 2 in order to put it in contact with the visible surface of the vacuuming mold, and wrapping a substantial part of each item 5 with the skin 2. This specific stage may be implemented according to the process described in French patent application No. 06 55425 and U.S. patent application Ser. No. 11/299,648 (both of which applications are incorporated herein by reference) in order to obtain an almost seamless transition area between each item 5 and the visible surface of the composite piece 1 in order to be able to integrate any shape of visible component 6, while using a single mold.

Referring to FIG. 1, to integrate at least one item 5 in the composite piece 1 to create a tactile type of means for switching, the process may optionally include integrating at least one item 5 the surface 11 of which is located on the visible surface of the composite piece 1 and has the same curvature as that of the visible surface. The visible surface obtained under these conditions presents a seamless and smooth appearance, and only the color and/or the backlighting of the items 5 make it possible to visually identify them on the visible surface of the composite piece 1.

Referring to FIG. 2, the process, according to embodiments of the invention may also include integrating a visible component 6 for each item 5 presenting, on the one hand, an edge 13 on its side walls turning perpendicular to the plane of the skin 2 at the area of integration of the item 5, and, on the other hand, on the surface 10 that faces away from surface 11 located on the visible surface of the composite piece, a recess 15 (see FIG. 3) formed by the edges 16 and designed to receive a control component 8 or module of actuation 7 to function with the latter.

The recess 11 makes it possible to increase the adhesion between the visible component 6 in the skin 2, as well as water tightness. One purpose of the recess 15 and the edges 13 is, in the context of the second embodiment, to ensure the connection of function between the visible area 6 and the actuation module 7, so that any pressure exerted on the visible area 6 is transmitted to the actuation module 7. Another purpose of the recess 15 and the edges 13 is, in the context of both embodiments, to retain the actuation module 7 or the control component 8 in position.

A process using embodiments according to the invention makes it possible to create, with only one mold, a composite piece 1 integrating several various types of items 5 forming switching devices which may be easily replaced or repaired, and in particular items forming touch keys.

A method for forming composite articles has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A process of assembling a composite piece for a vehicle compartment, the composite piece having a skin connected to a substrate via a foaming material, and including at least one item forming a switching device that has a visible area, which is joined to a control component connected to an electrical control circuit, so as to transmit switching or actuation information to the electrical control circuit, the process comprising:

wrapping part of the visible area of each item with a skin so that the skin retains the visible area and that the skin and the visible area are joined to seamlessly define the visible surface of the composite piece, including the area of transition between the skin and the visible area of each item forming the switching device, the wrapping being accomplished by complementary stages comprising:

arranging the substrate so that it faces the skin, the substrate having a passage opening aligned with the visible area;

placing a spare piece against the back face of the visible area of each item opposite the face located on the visible surface, the spare piece having a shape corresponding at least to a volume sufficient for occupancy by the control component at the location of the respective item and between the substrate and the skin, having a cross section corresponding substantially to the shape of the respective passage opening located in the substrate, and having a length sufficient to extend from the back face of the visible area at least to the respective passage opening;

injecting the foaming material between the skin and the substrate, so that the foaming material expands within the space located between the skin and the substrate, and in particular around each spare piece;

withdrawing each spare piece after the expansion of the foaming material; and placing a control component to the composite piece at each passage opening.

2. The process of assembling a composite piece according to claim 1, wherein the control component comprises a capacitance detector.

3. The process of assembling a composite piece according to claim 1, wherein the control component comprises an optical detector.

4. The process of assembling a composite piece according to claim 1, wherein the control component comprises a field detector.

5. The process of assembling a composite piece according to claim 1, wherein the visible area is connected to actuate the control component via a movable actuation module that transmits to the control component application of pressure exerted on the visible area, and wherein the actuation module is placed through a respective passage opening before the control component is placed at the passage opening.

6. The process of assembling a composite piece according to claim 5, wherein the actuation module comprises one of said spare pieces.

7. The process of assembling a composite piece according to claim 5, wherein at least one of the items is backlit and has a visible area that is translucent or transparent, and has a light device integrated in the actuation module.

8. The process of assembling a composite piece according to claim 1, wherein the corresponding control component for each item is attached to the substrate on a side of the substrate facing away from the skin.

9. The process of assembling a composite piece according to claim 1, wherein at least one of the items is backlit and has a visible area that is translucent or transparent, and has a light device integrated in the actuation module or control component.

10. The process of assembling a composite piece according to claim 9, wherein an area of the skin, which was in contact with the spare piece, is cut out and then removed from the composite piece after the spare piece has been withdrawn and before placing the control component.

11. The process of assembling a composite piece according to claim 10, wherein the skin is opaque at least where each item is integrated with the skin.

12. The process of assembling a composite piece according to claim 1, wherein the stage of arranging the substrate so that it faces the skin comprises:

placing the item on the visible surface of a mold for vacuum molding, aligning the skin above the mold for vacuum molding, applying an aspirating force via the vacuum from the vacuum molding, attracting the skin in order to put it in contact with the visible surface of the vacuuming mold, and wrapping a substantial part of each item with the skin.

13. The process of assembling a composite piece according to claim 12, wherein at least one items integrated into the composite piece has a visible surface that presents substantially the same curvature as that of an outward facing surface of the composite piece.

* * * * *